United States Patent Office 2,894,804
Patented July 14, 1959

2,894,804

PROCESS OF EXTRACTING URANIUM AND RADIUM FROM ORES

Carl W. Sawyer, Butte, Mont., and Robert W. Handley, deceased, late of Denver, Colo., by Mabel P. Handley, administratrix, Denver, Colo., assignors to the United States of America as represented by the United States Atomic Energy Commission No Drawing. Application March 2, 1949
Serial No. 79,302

7 Claims. (Cl. 23—14.5)

This invention relates to the recovery of uranium and radium values from uranium ores, and more particularly to the recovery of uranium and radium values by a leaching process using aqueous solutions of ferric chloride.

An object of this invention is to provide a method of recovering uranium and radium values from uranium ores, and from ore tailings and concentrates containing such values.

Another object of this invention is to provide a simple efficient process of recovering uranium from its ores and to provide a process of extracting radium from uranium minerals as found in uranium containing ores, tailings and concentrates.

A still further object is to provide a simple leaching process for the extraction of uranium and radium values from materials containing them such as uranium ores.

Still further objects of the present invention will be apparent from the following description taken in connection with the appended claims.

Broadly the objects of this invention are accomplished by the use of an aqueous solution of ferric chloride to leach uranium materials under optimum conditions of temperature, pH, volume of leaching solution, and concentration of $FeCl_3$ in said solution. Although this leaching with $FeCl_3$ solution may be carried out in the cold or at room temperature it was found to be more rapid when carried out at elevated temperatures usually above 50° C. and more particularly around 75° to 85° C. When pressure is used the leaching may be carried out at higher elevated temperatures.

The various uranium ores are dry crushed and ground to pass a 65 mesh screen prior to the leaching process in which the uranium dissolves from these ores as a chloride, probably as $UO_2Cl_2$. During leaching there is a decrease in the size of the pure uranium mineral particles as the uranium dissolves and a gas is evolved which has been identified as oxygen. The solvent leaching solution usually shows a marked increase in its content of ferrous chloride and free hydrochloric acid at the expense of the original content of ferric chloride. Furthermore, a flocculent brown precipitate, which probably is hydrous iron oxide, is thrown down.

In accordance with the present invention the ground uranium ore is leached at an elevated temperature of approximately 75° to 85° C. with a $FeCl_3$ solution, containing usually two to fifteen pounds of $FeCl_3.6H_2O$ per pound of uranium values to be recovered. The amount of $FeCl_3$ used depends on whether or not some of the $FeCl_2$ is regenerated to $FeCl_3$ either by the injection of air or by the addition or presence of special regenerative reagents. If the uranium ore contains interfering substances such as calcite or dolomite which would consume undue amounts of $FeCl_3$ a suitable amount of a mineral acid such as HCl may be added. Upon completion of the leach the solution is separated from the ore by filtration or decantation and treated to separately recover the leached uranium and radium values. This filtrate may be treated to recover either uranium or radium first and subsequently treated to recover the other metal. In recovering uranium first, barium carbonate, preferably very finely ground, and as a slurry, is added to the filtrate to precipitate granular $UO_2CO_3.H_2O$, possessing excellent filtration properties. The uranium precipitation with barium carbonate is best completed at a pH less than 6 at which acidity radium and most of the other metals such as cobalt, nickel and ferrous iron remain soluble. The uranium precipitate which is believed to be $UO_2CO_3.H_2O$ is then separated from the solution by filtration or decantation means. Sufficient $H_2SO_4$ is added to the filtrate in order to precipitate the Ra as mixed barium and radium sulphate.

It is usually desirable to remove any excess ferric iron and copper present prior to the addition of the $BaCO_3$. This may be accomplished by the addition of calcium carbonate usually in a finely ground condition to the solution and controlling the acidity to about a pH of 4.5–4.7. This precipitation of ferric iron and copper although satisfactory from a cold solution has been found to be faster and more efficient when the solution is warmed and the precipitate gives no difficulty in filtering or washing. Other metals such as copper and lead which may be present in the ore are also removed by this step. Other precipitants for ferric iron such as various soluble hydroxides—caustic soda or lime or soluble carbonates—soda ash or ammonium carbonate may be used in place of calcium carbonate. As a small amount of uranium may also be precipitated with the ferric iron by this step the precipitate may be recycled for a further leaching with $FeCl_3$.

It is desirable to control the amount of $FeCl_3$ in the leaching solution in such a manner that at the end of the leach, there will be the minimum possible amount of ferric iron in solution. This may be accomplished by leaching in stages.

The details of the present invention will become more apparent from the following examples which will further illustrate how the process of recovering metallic values from uranium minerals by which the objects of this invention are accomplished may be carried out in practice; however, the invention is not to be limited specifically to the details of these examples.

*Example I*

139 grams of a highly siliceous uranium ore which analyzed 3.4% in $U_3O_8$ was dry crushed to pass 65 mesh. Besides uranium which was present mainly in such uranium minerals are pitchblende and/or uraninite and their alteration products curite, uranophane, soddyite, shlodowskite, hasolite and such uranium phosphate minerals as torbermite and dewindtite the uranium ore contained some oxidized minerals of copper, cobalt and nickel. 312 cc. of a $FeCl_3$ leaching solution containing 30 grams of $FeCl_3.6H_2O$ to 300 cc. of water was added to the finely divided ore and heated to 80° C. to 85° C. After leaching for four hours at 80° to 85° C. the solution was separated by filtration. The residue of 132 grams was easily filtered and washed on the filter. It contained, as shown by analysis, only 3.3% of the uranium values originally present in the ore. The filtrate of the $FeCl_3$ leaching was found to contain 96.7% of the uranium values formerly present in the ore treated. The filtrate was also tested for radium and was found by a radiometric analysis to contain 89% of the radium formerly present in the ore treated.

*Example II*

300 grams of a highly siliceous uranium ore which analyzed 2.7 percent in $U_3O_8$ was dry crushed to pass 65 mesh. Besides the uranium which was present mainly in the form of such uranium minerals as torbernite, pitchblende and/or uraninite and their alteration products the uranium ore contained small percentages of such base metals as cobalt, nickel, copper, lead and manganese. These base metals were present mainly as the oxides; the ore containing approximately 3 percent of cobalt and nickel oxides and about five-tenths of a percent each of copper, lead and manganese oxides.

624 cc. of an aqueous solution of $FeCl_3 \cdot 6H_2O$ prepared by mixing 60 grams of $FeCl_3 \cdot 6H_2O$ with 600 grams of water was slowly added to the 300 grams of crushed ore making approximately two parts by weight of the solution to one part by weight of the ore. The leaching solution was then heated to 85° C. After six hours, the dilution was increased to three parts by weight of solution to one part by weight of ore by the addition of water. The solution was heated at 85° C. for eighteen more hours during which time sufficient water evaporated to bring the final dilution to two parts by weight of solution to one part by weight of ore and the solution was then filtered. The pH was noted to be approximately 2 at end of the leach. An analysis of a small portion of the filtrate showed that the ferric chloride leach had extracted 95.3 percent of the uranium and 84.8 percent of the radium as well as 88 percent of the cobalt, 19 percent of the nickel, 28 percent of the lead and 25 percent of the copper originally present in the ore. The analysis also showed that very little ferrous iron was present in the filtrate after the ferric chloride leach indicating the regeneration of a good part of the ferrous iron to ferric iron during this leaching operation.

17.33 grams of finely ground calcium carbonate was added to the filtrate to precipitate the ferric iron and some of the other base metals at a pH less than 4.7 and the solution was filtered to remove the precipitate. This precipitate containing the ferric iron, 5.1 percent of the extracted radium values and twenty percent of the extracted uranium values may be recycled for a further ferric chloride leaching.

8.73 grams of finely divided barium carbonate was added as a slurry to the filtrate from the preceding operation to precipitate the uranium from the solution as granular, free settling $UO_2CO_3 \cdot H_2O$. When the precipitation was complete at a maximum pH of approximately 5.8–6.0 the solution was filtered and the precipitate removed. It is preferable to make this precipitation in such a manner as to assure complete utilization of $BaCO_3$ which otherwise would contaminate the $UO_2CO_3 \cdot H_2O$ precipitate. This is best accomplished by step-precipitation whereby a given volume of the purified leaching solution heated preferably above 50° C. is agitated in the primary step with an amount of barium carbonate less than the stoichiometric requirement of the uranium in solution until all the barium carbonate is consumed. The high grade $UO_2CO_3 \cdot H_2O$ precipitate is filtered and washed. The solution from this filtration is then agitated, either warm or cold, with slightly more than the stoichiometric requirement of $BaCO_3$, whereby additional and complete precipitation of uranium is assured, and the solution from this step passes to the subsequent procedure for radium recovery. The uranyl carbonate of this second step, after filtration or simple thickening is passed to the primary step of uranium precipitation. An analysis of a portion of the precipitate and of the filtrate of the barium carbonate precipitation showed that the precipitate contained eighty percent of the uranium and fifteen percent of the radium extracted from the ore. This uranium precipitation with barium carbonate is best completed at a pH of approximately 6 or less at which acidity radium and most of the other base metals such as ferrous iron, nickel and cobalt remain in solution.

To recover the radium in the filtrate from the uranyl carbonate precipitation step sufficient $H_2SO_4$ was added to the filtered solution to bring the pH to about 2.5 and to precipitate the radium from the filtrate as mixed barium and radium sulfate. This precipitation was considered complete when free $H_2SO_4$ was found in the solution; and an analysis of the precipitate and filtrate showed that this precipitation recovered approximately 80 percent of the radium extracted from the ore.

These examples show that this invention provides a simple process for recovering uranium and radium values from uranium ores. Analyses show that approximately 80 percent of the uranium values extracted from the ore were recovered by the barium carbonate precipitation and that approximately 80 percent of the radium values extracted from the ore were recovered by the $H_2SO_4$ precipitation. A higher recovery of radium values is possible if the radium is separated from the ferric chloride leaching solution prior to the purification step by the addition of sufficient $H_2SO_4$ and a barium salt such as barium chloride to the ore leach solution to precipitate the radium as mixed barium and radium sulfates. The filtrate from the removal of such mixed barium and radium sulfates then is agitated with a small amount of barium chloride for the elimination of the remaining sulfate ion and then with finely ground calcium carbonate to remove the free HCl acidity and the residual excess ferric iron that may be in solution. The pH of this precipitation is easily controlled at approximately 4.5 to 4.7. As a small amount of uranium values may be precipitated in this step, the precipitate may be recycled for further leaching with ferric chloride. Uranium values are then removed from the filtrate by the addition of barium carbonate in a two-stage precipitation of $UO_2CO_3 \cdot H_2O$ at an elevated temperature of above 50° C. The barium carbonate for this precipitation is preferably very finely ground and is best added as a slurry.

In the leaching process disclosed by this invention uranium and radium values may be extracted usually as metallic chlorides from various uranium minerals such as the uranium oxides, the hydrous oxides, the hydrated uranates, the hydrated silicates, the phosphates, and vanadates and from many other uranium minerals. The uranium values are probably extracted as uranyl chloride from these uranium minerals according to the following illustrative equations. With pitchblende and/or uraninite which is considered to be a complex combination of $UO_3$ and $UO_2$ the reaction of the $FeCl_3$ leaching solution is probably according to the following equation:

(1) $U_3O_8 + 6FeCl_3 + xH_2O \rightarrow$
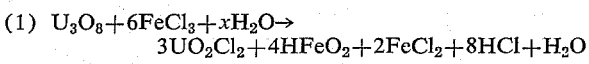
$3UO_2Cl_2 + 4HFeO_2 + 2FeCl_2 + 8HCl + H_2O$ The chemical analyses of the solutions and residue support the foregoing equation in respect to the production of ferrous chloride, hydrous iron oxide and free hydrochloric acid in addition to the uranyl chloride. The reaction of the $FeCl_3$ leaching solution with the hydrated lead uranates (curite, fourmarierite, etc.) is probably according to the following reaction for curite:

(2) $2PbO \cdot 5UO_3 \cdot 4H_2O + 14FeCl_3 + 26H_2O \rightarrow$
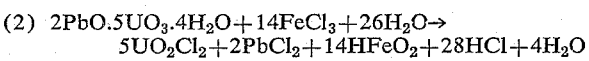
$5UO_2Cl_2 + 2PbCl_2 + 14HFeO_2 + 28HCl + 4H_2O$ The reaction for the hydrated silicates (soddyite, shinkolobwite, etc.), as well as for the calcium and magnesium silicates (uranophane, sklodowskite, kasolite, etc.) is probably according to the following equation:

(3) $12UO_3 \cdot 5SiO_2 \cdot 14H_2O + 24FeCl_3 + 48H_2O \rightarrow$
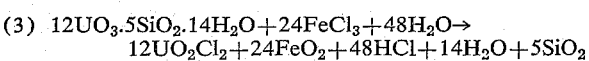
$12UO_2Cl_2 + 24FeO_2 + 48HCl + 14H_2O + 5SiO_2$ For the hydrated uranium phosphate minerals such as autunite and torbernite the reaction with $FeCl_3$ solution is probably according to the following reaction of torbernite with $FeCl_3$.

(4) $CuO \cdot 2UO_3 \cdot P_2O_5 \cdot 8H_2O + 6FeCl_3 + 14H_2O \rightarrow$
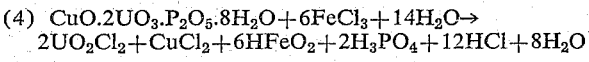
$2UO_2Cl_2 + CuCl_2 + 6HFeO_2 + 2H_3PO_4 + 12HCl + 8H_2O$ The reaction for the vanadates such as carnotite with FeCl₃ leaching solution is probably according to the following equation:

(5) $K_2O \cdot 2UO_3 \cdot V_2O_5 \cdot 2H_2O + 6FeCl_3 + 12H_2O \rightarrow 2UO_2Cl_2 + 2KCl + 6HFeO_2 + 2H_3VO_4 + 12HCl$ As HCl is formed as ferric chloride dissociates leaching with only HCl was considered and it was found that use of a FeCl₃ leach was far superior. In addition it was surprising to note that the attack of FeCl₃ observed under a binocular microscope by a solution of FeCl₃ on pitchblende and/or uraninite mineral cannot be obtained with an HCl solution of far greater strength. A five percent FeCl₃·6H₂O solution, which in neutral salt form contains approximately two percent HCl equivalent is far more efficient than two percent HCl solution. Special studies also indicate that there is a selective attack of ferric chloride on the uranium oxides in preference to other base oxides.

The simple process of recovering metallic values from uranium ores as disclosed by this invention may be made more efficient and inexpensive by recycling a number of the precipitates and regenerating and reusing some of the reagents such as regenerating ferric iron used by the injection of air during the leaching step. Ferric iron may also be regenerated by the presence or addition of cobaltic oxide which oxidizes ferrous iron to the ferric state according to the following reaction of cobalt oxide with ferrous chloride:

(6) $Co_2O_3 \cdot H_2O + 2FeCl_2 + 6HCl \rightarrow 2CoCl_2 + 2FeCl_3 + 4H_2O$

Having broadly and specifically disclosed the present invention, it is apparent that many modifications and variations may be made without departing essentially from the nature and scope thereof as may be included within the following claims and it is intended to cover in the appended claims all such modifications as fall within the true spirit and scope of the disclosed invention.

We claim:

1. A process of recovering uranium values from a uranium ore which comprises leaching the ore with a ferric chloride solution; separating the leaching solution from the ore residue and precipitating the uranium present in the filtrate by adding a uranium precipitant to the separated leaching solution.

2. A process of recovering uranium values from a uranium ore which comprises leaching the ore with a ferric chloride solution; filtering the leaching solution from the ore residue; adding barium carbonate to the filtrate to precipitate the uranium present.

3. A process of extracting uranium from a uranium ore which comprises leaching the ore with a ferric chloride solution at an elevated temperature; separating the leaching solution from the ore residue by filtration, purifying the filtrate of excess ferric iron and adding BaCO₃ to the purified filtrate to precipitate the uranium present.

4. A process of recovering radium from a uranium ore which comprises leaching the ore with a ferric chloride solution; separating the ore residue from the leaching solution; and precipitating the radium present in the solution by adding a radium precipitant to the separated leaching solution.

5. A process of recovering radium from a uranium ore which comprises leaching the ore with a ferric chloride solution; filtering the leaching solution from the ore residue; and adding sulfuric acid and a barium salt to precipitate the radium as a mixed barium and radium sulfate.

6. A process of extracting uranium and radium values from uranium ore which comprises leaching the ore with a ferric chloride solution; separating the ore residue from the leaching solution; purifying the separated leaching solution of ferric iron; adding a uranium precipitant to the solution to precipitate the uranium present at a pH less than 6, separating the precipitate from the solution and adding a radium precipitant to the solution to precipitate the radium present.

7. A process of extracting uranium and radium values from a uranium ore which comprises leaching the ore with a ferric chloride solution at an elevated temperature of above 50° C. and at a pH less than 4; separating the ore residue from the leaching solution by filtration; precipitating the excess ferric iron present at a pH of less than 5 by adding CaCO₃ to the filtrate; separating the precipitate by filtration; precipitating the uranium present in the filtrate at a pH less than 6 by adding BaCO₃ to the filtrate; separating the precipitate by filtration; and precipitating the radium present in the filtrate by adding H₂SO₄ to the filtrate.

No references cited.